(12) United States Patent
Ringer (10) Patent No.: US 6,810,963 B2
(45) Date of Patent: Nov. 2, 2004

(54) DRY PIPE VALVE FOR FIRE PROTECTION SPRINKLER SYSTEM

(75) Inventor: Yoram Ringer, Providence, RI (US)

(73) Assignee: Grinnell Corporation, Westminster, MA (US)

( * ) Notice: Subject to any disclaimer, the term of this patent is extended or adjusted under 35 U.S.C. 154(b) by 0 days.

(21) Appl. No.: 10/391,657

(22) Filed: Mar. 20, 2003

(65) Prior Publication Data

US 2003/0178206 A1 Sep. 25, 2003

Related U.S. Application Data

(63) Continuation of application No. 09/593,101, filed on Jun. 13, 2000, now Pat. No. 6,557,645.

(51) Int. Cl.[7] ............................................... A62C 35/00
(52) U.S. Cl. .............................. 169/17; 169/22; 169/19; 169/20; 137/516.25; 137/527.8; 137/559; 251/74
(58) Field of Search .............................. 169/17, 19, 20, 169/18, 21, 22; 137/527, 527.2, 527.4, 527.6, 527.8, 516.25, 559; 251/72, 74, 298

(56) References Cited

U.S. PATENT DOCUMENTS

| 533,824 | A | * | 2/1895 | Neracher ..................... 169/22 |
| 1,630,783 | A | | 5/1927 | Clark |
| 1,662,839 | A | | 3/1928 | Tyden |
| 1,790,467 | A | | 1/1931 | Griffith |
| 1,866,766 | A | * | 7/1932 | Griffith ........................ 169/22 |
| 2,900,029 | A | | 8/1959 | Herkimer |
| 3,135,332 | A | | 6/1964 | Merdinyan |
| 3,613,720 | A | * | 10/1971 | Welch ..................... 137/525.3 |
| 4,552,221 | A | | 11/1985 | Klein |
| 4,854,342 | A | | 8/1989 | Polan |

OTHER PUBLICATIONS

"Automatic Sprinkler and Standpipe System", Second Edition; John L. Bryan; pp. 307–319.
"4" Model A Dry Pipe Valve Flange x Groove; Star Sprinkler Inc., 06/97; pp. 1–8.
"Model LDX Dry Pipe Valve System 4 and 6 Inch Sizes"; The Reliable Automatic Sprinkler Co., Inc.; Bulletin 355A; pp. 1–4.
"Model D 3, 3 1/2, 4 & 6 Inch Dry Pipe Valve"; Firematic Sprinkler Devices, Inc.; pp. 69–72.
"Dry Pipe Valve—Flange x Groove—AG, Flange x Flange—AF"; Central Sprinkler Company; Brochure No. 10–4.0; pp. 1–12.

(List continued on next page.)

Primary Examiner—Dinh Q. Nguyen
(74) Attorney, Agent, or Firm—Morgan Lewis & Bockius LLP (57) ABSTRACT

A differential-type dry pipe valve for a fire protection sprinkler system has a ratio of effective air sealing area to service water sealing area that is smaller than a ratio of service water pressure to system air pressure at which the fire protection sprinkler system is actuated.

20 Claims, 12 Drawing Sheets

OTHER PUBLICATIONS

"Dry Pipe Valve—4 and 6 Inch (100 and 150 mm), Model F302 (Flange × Flange) & F3021 (Flange × Groove)"; Grinnel Corporation; Printed 11/97; pp. 1–15.

"Automatic Model 39 Dry Pipe Valves"; Automatic Sprinkler Fire Protection Equipment; 6/82; pp. 2.1–2.17.

"Grinnell Dry Pipe Valve—Model F300—Basic Trimmings—Instructions for Installation Care and Maintenance"; Grinnell Fire Protection Systems Company, Inc.; Grinnell Fire Protection Systems Company Limited.

"Grinnel Dry Pipe Valve Model E-2, Basic Trimmings—Instructions for Installation Care and Maintenance"; Grinnel Fire Protection Systems Company, Inc.; Mar. 1974, pp. 1–8.

"Grinnel Dry Pipe Valve, Model 'E'—Descriptions, Instructions for Maintenance, Etc.—Special Supplement"; Grinnell Company, Inc.; pp. 1–8.

"Grinnell Dry–Pipe Valves—Models 'C' and 'D'—Instructions for Servicing"; Grinnell Company, Inc., Nov. 1935.

"Fire Protection Handbood—Fourteenth Edition"; National Fire Protection Association; Gordon P. McKinnon, Editor and Keith Tower, Assistant Editor; Chapter 2, pp. 14-17–14-23.

"Fire Protection —Automatic Sprinkler Systems—Part 3: Requirements and test methods for dry pipe valves"; International Standard; ISO 6182–3 First Edition Jun. 15, 1993; Reference No. ISO 6182–3:1993(E); pp. I–iv; pp. 1–13.

"Approval Standard—Dry Pipe Valves"; Factory Mutual Research; Revised Nov. 1973, Class No. 1021; pp. 1–7.

* cited by examiner

DRY PIPE VALVE FOR FIRE PROTECTION SPRINKLER SYSTEM

This application is a continuation application pursuant to 35 U.S.C. § 120 of original application Ser. No. 09/593,101, entitled "Dry Pipe Valve for Fire Protection Sprinkler System" filed on Jun. 13, 2000 now U.S. Pat. No. 6,557,645, which original application is hereby incorporated by reference in its entirety in this continuation application.

TECHNICAL FIELD

This invention relates to dry pipe automatic fire protection sprinkler systems.

BACKGROUND

Dry pipe automatic fire protection sprinkler systems are typically employed for the purpose of providing automatic sprinkler protection in unheated occupancies and structures that may be exposed to freezing temperatures. The dry pipe sprinkler system is connected to a public or private water main providing a reliable supply of water, and typically includes an indicating type of water flow valve, e.g. a water gong or other alarm flow valve, a fire department connection and a dry pipe valve. The dry pipe system is used primarily in unheated warehouses and the like where water-filled pipes cannot be used, so the dry pipe valve must be protected against freezing by locating it in a heated portion of the structure, e.g. in the warehouse office or in a heated enclosure provided for the purpose, to protect the dry pipe valve from freezing.

The sprinkler portion of a dry pipe sprinkler system has an arrangement of piping similar to a wet pipe sprinkler system. However, rather than water, the dry pipe sprinkler system contains air or nitrogen under pressure above the dry pipe valve. The air pressure restrains the water in the supply main at the dry pipe valve by holding the valve in closed position until one or more sprinklers open, e.g., in the presence of fire. The loss of air pressure allows the dry pipe valve to open, permitting flow of water through the valve into the arrangement of piping and on to the open sprinkler at the location of a fire.

Many dry pipe valves are of the differential-type, single clapper construction. These center differential pressure valves are designed with a dry system seat and a water supply seat concentrically located with their axes at an equal distance from the center of the clapper hinge pin. As seen from the following equation, the differential ratio is the relationship of the air seat area divided by the water seat area:

$$DF=(AD/WD)^2*L2/L1$$

$$AD=\sqrt{DF*WD^2}$$

where:

AD=system (air) valve seat mean diameter

WD=supply (water) seat mean diameter

DF=differential, i.e., the ratio between the system water pressure and system air pressure (where 5.5 to 6.0 is the industry standard)

L1=distance between the center of the hinge or pivot and the center of air pressure (i.e., the air valve seat axis)

L2=distance between the center of the hinge or pivot and the center of water pressure (i.e., the water valve seat axis).

By way of example, for a 6-inch single clapper, differential-type dry pipe valve, where:

$$WD=6; DF=5.5; L1=L2$$

$$AD=\sqrt{DF*WD^2}=14 \text{ inches}$$

In the case of a typical ratio of 5.5 (the industry standard), a 6-inch diameter water supply thus requires a 14-inch diameter air valve seat. This valve design is very reliable and made from relatively few parts; however, this relationship also results in a valve that is relatively large and heavy, and therefore difficult to install. An alternative design for achieving a relatively lower weight is a mechanical latching dry valve. This type of dry pipe valve is relatively smaller in size, but it requires more components, and it is often more difficult to maintain because of the relatively greater number of parts located within its auxiliary chamber.

SUMMARY

According to one aspect of the invention, a differential-type dry pipe valve for a fire protection sprinkler system has a ratio of effective air sealing area to service water sealing area that is smaller than a ratio of service water pressure to system air pressure at which the fire protection sprinkler system is actuated.

According to another aspect of the invention, a dry pipe valve for a fire protection sprinkler system has a water valve seat and an air valve seat, the water valve seat being off-center relative to said air valve seat.

According to still another aspect of the invention, a differential-type dry pipe valve for a fire protection sprinkler system comprises a valve body defining an inlet and an outlet, a water-side chamber in communication with the inlet and an air-side chamber in communication with the outlet, and, therebetween, an air valve seat having an air valve axis and a water valve seat having a water valve axis. A clapper is mounted to pivot about a pivot axis closely adjacent the air valve seat between a first, clapper-closed position for resisting flow of water through the water valve seat and a second, clapper-open position for permitting flow of water through the water valve seat toward the air-side chamber. An air valve seal is mounted for sealing engagement with the air valve seat with the clapper in the first, clapper-closed position, and a water valve seal is mounted for sealing engagement with the water valve seat with the clapper in the first, clapper-closed position. In one embodiment, the air valve seat is centered a first radial distance from the pivot axis and the water valve seat is spaced a second radial distance from the pivot axis, the first radial distance being greater than the second radial distance. In another embodiment, the air valve seat and the water valve seat are asymmetrically arranged.

Preferred embodiments of this aspect of the invention may include one or more of the following additional features. The clapper is held in the first, clapper-closed position by air pressure maintained in the air-side chamber and the fire protection sprinkler system, and the clapper is urged from the first, clapper-closed position toward the second, clapper-open position by water pressure from the water-side chamber upon reduction of air pressure in the air-side chamber and the fire protection sprinkler system. Preferably, reduction of air pressure in the air-side chamber and fire protection sprinkler system results from opening of one or more fire protection sprinklers of the fire protection sprinkler system. The air valve seal and/or the water valve seal is mounted to the clapper. The dry pipe valve further comprises a latch member adapted, in a first latch member position, to permit movement of the clapper from its first, clapper-closed position toward its second, clapper-open position and to resist return movement of the clapper from its second, clapper-open position toward its first, clapper-closed position. Preferably, the latch member is mounted to the body for movement between the first latch member position resisting return movement of the clapper toward its first, clapper-closed position and a second latch member position permitting return movement of the clapper from its second, clapper-open position toward its first, clapper-closed position. More preferably, the latch member comprises an actuator disposed outside the body for movement of the latch member from the first latch member position resisting return movement of the clapper toward its first, clapper-closed position toward the second latch member position permitting return movement of the clapper toward its first, clapper-closed position. The air valve seal has a first surface disposed for sealing engagement with the air valve seat and an opposite, second surface exposed for application of sealing pressure to the air valve seal upon the air valve seat. The water valve seal has a first surface disposed for sealing engagement with the water valve seat and an opposite, second surface exposed for application of sealing pressure to the water valve seal upon the water valve seat. The dry pipe valve comprises a single clapper. The clapper, in its first, clapper-closed position, defines an atmospheric region generally between the air valve seat and the water valve seat. Preferably, the atmospheric region defined by the clapper generally between the air valve seat and the water valve seat is asymmetrical about the air valve axis. The first radial distance of the air valve seat center from the pivot axis is less than about 1.8 times the second radial distance of the water valve seat center from the pivot axis.

Objectives of the invention include providing a dry pipe valve of simple construction, with few moving parts, compact size, and lighter weight, compared to prior art dry pipe valves of similar specification.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Referring to FIGS. 1–5, a differential-type dry pipe valve 10 of the invention, for use in an automatic fire protection sprinkler system, has a body 12 defining an inlet 14 and an outlet 16, and a valve access port 18 (FIG. 4) secured by a cover 20. The body 12 further defines a water-side chamber 22 in communication with inlet 14, and an air-side chamber 24 in communication with the outlet 16. Referring also to FIGS. 6–9, a seat body 28, defining a passageway 27 surrounded by an air valve seat 30 and a water valve seat 32, is disposed in an aperture 26 defined by the body 12 between the water-side chamber 22 and the air-side chamber 24. Referring in addition to FIGS. 10–14, a single clapper 34 is mounted between ears 36, 37 of the seat body 28 to pivot about an axis, C (FIG. 2), which is closely adjacent and tangential to the air valve seat 30. Referring finally to FIGS. 15–19 and FIGS. 20–23, a clapper diaphragm 38, mounted to the clapper 34 by clapper diaphragm retaining plate 39, defines an air valve seal 40 and a water valve seal 42. In closed position of the clapper 34, the surface 41 of air valve seal 40 sealingly engages upon the air valve seat 30, and the surface 43 of water valve seal 42 engages sealingly upon the water valve seat 32, both in a water-tight manner, to resist leakage of water from the water-side chamber 22 toward the air-side chamber 24. The region 44 cooperatively defined by the seat body 28 and the clapper diaphragm retaining plate 39, generally between the air valve seat 30 and seal 40 and the water valve seat 32 and seal 42, is maintained at ambient pressure, and water leakage past water valve seat 32 and seal 42 is released through drain port 46.

Figure 7:
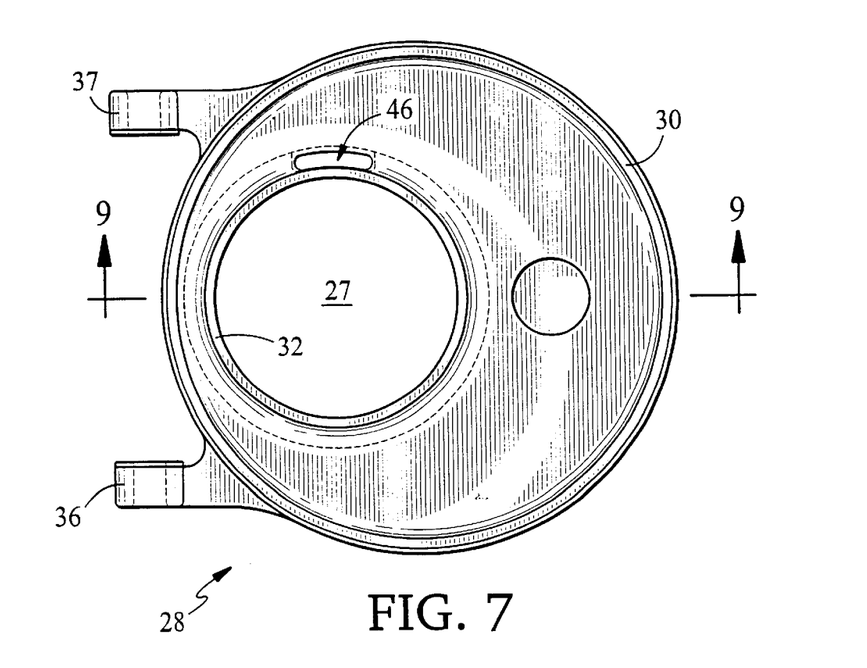
FIG. 7 is a top plan view of the seat body of FIG. 6.
Figure 8:
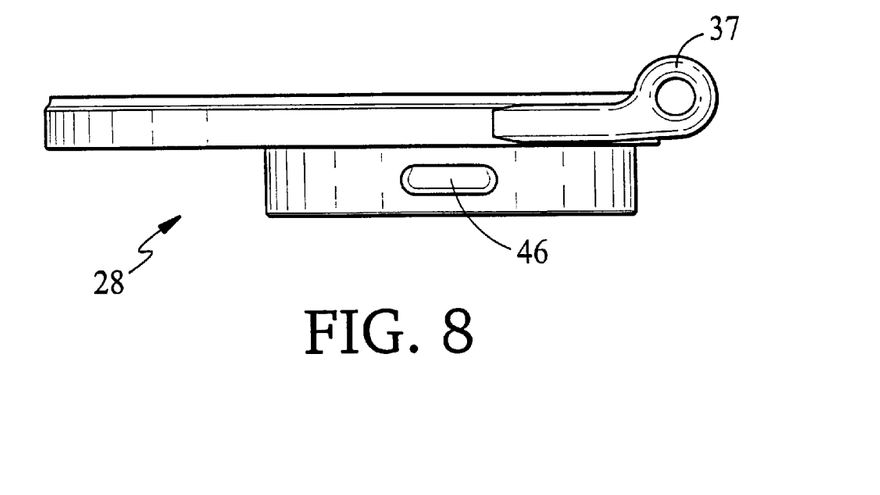
FIG. 8 is a first side view of the seat body of FIG. 6.
Figure 9:
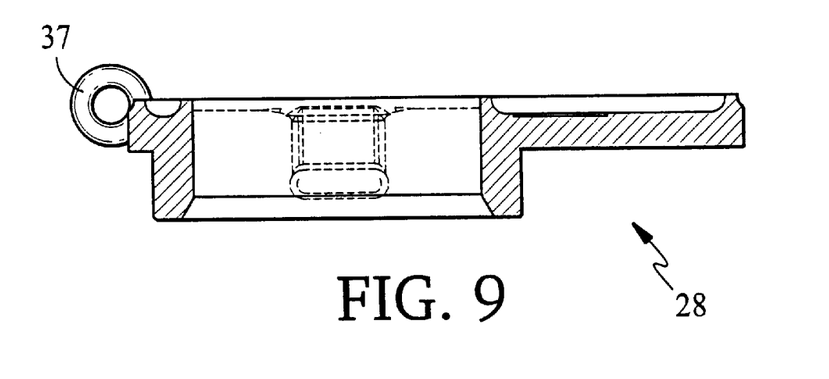
FIG. 9 is an opposite, second side sectional view of the seat body, taken at the line 9—9 of FIG. 7.
Figure 10:
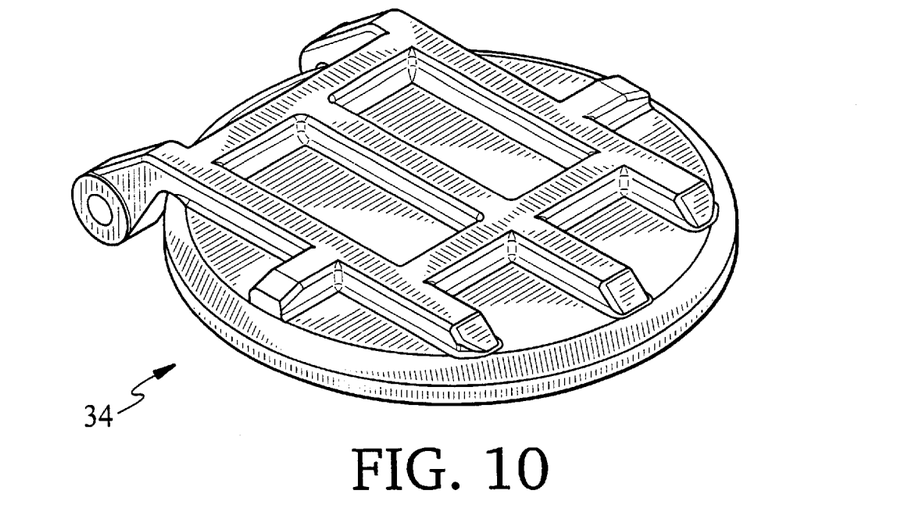
FIG. 10 is a perspective view of the clapper of the dry pipe valve of FIG. 1.
Figure 11:
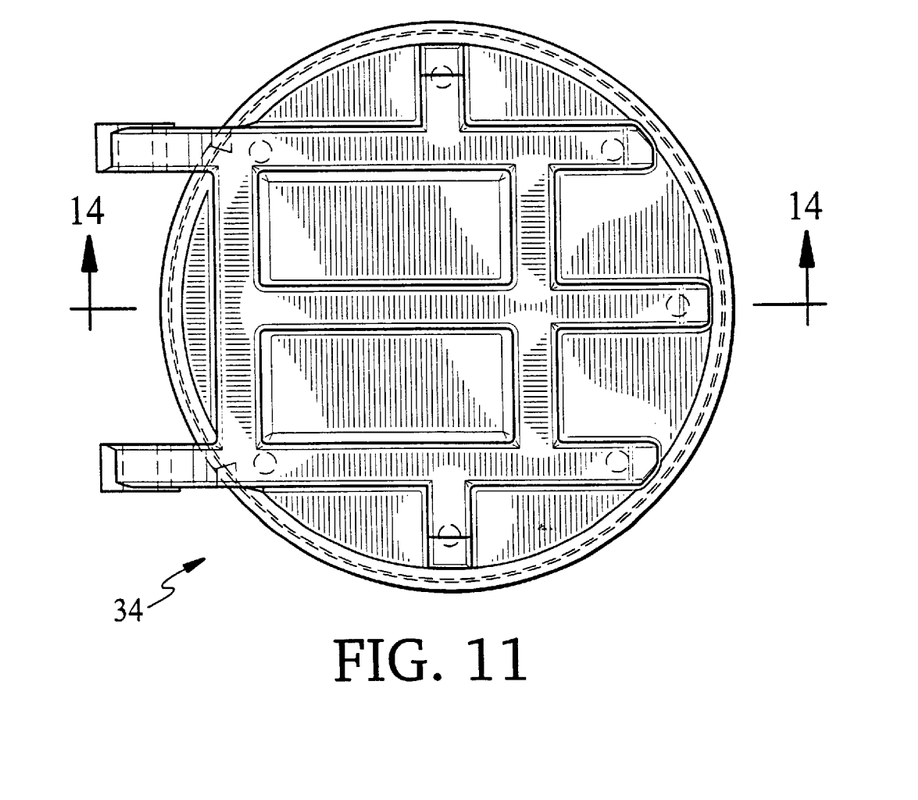
FIG. 11 is a top plan view of the clapper of FIG. 10.
Figure 12:
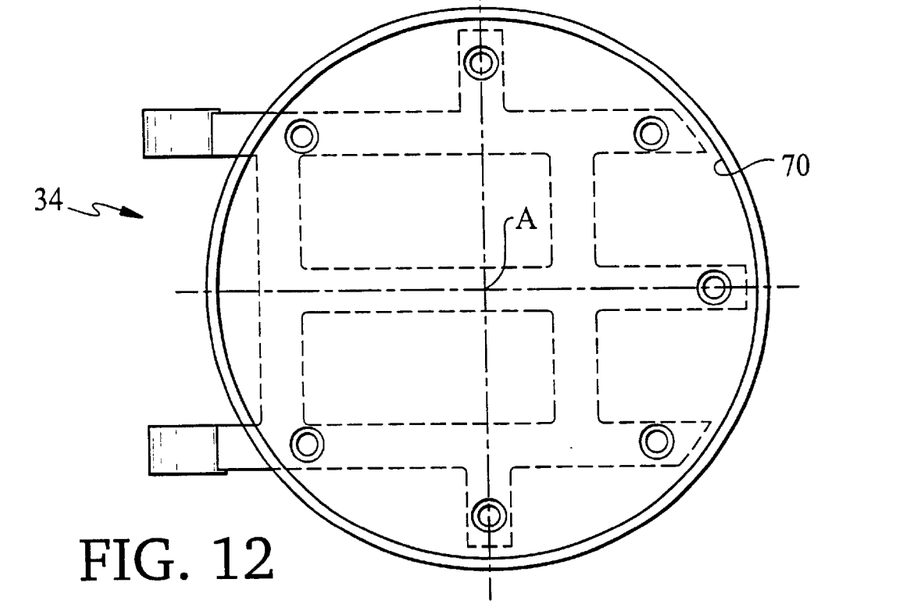
FIG. 12 is a bottom plan view of the clapper of FIG. 10.
Figure 13:
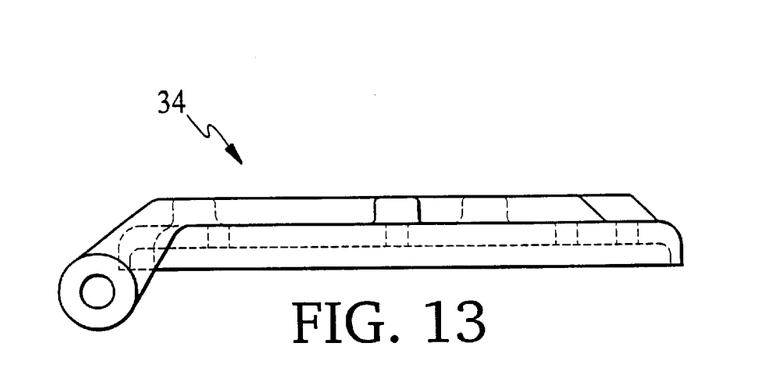
FIG. 13 is a side view of the clapper of FIG. 10.
Figure 14:
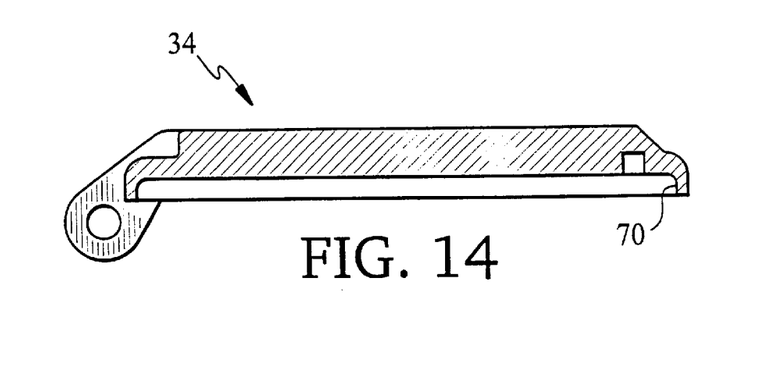
FIG. 14 is a side sectional view of the clapper, taken at the line 14—14 of FIG. 11.
Figure 15:
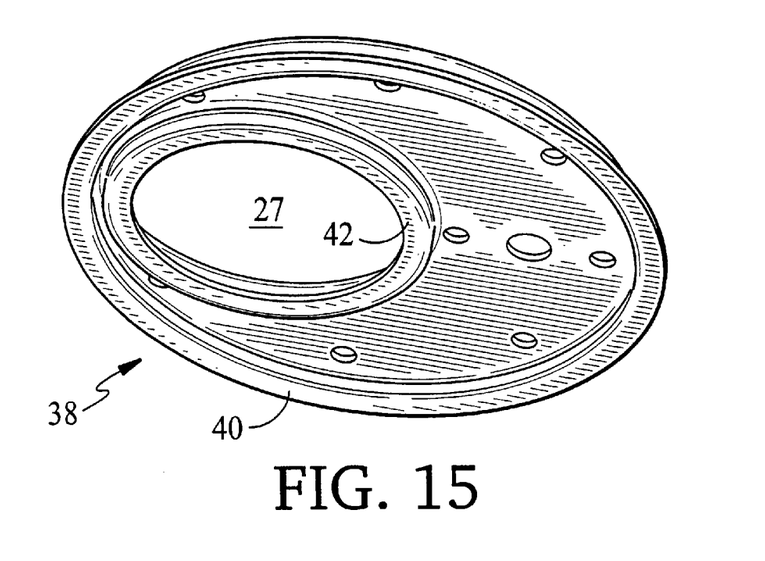
FIG. 15 is a perspective view of a clapper diaphragm for the dry pipe valve of FIG. 1.
Figure 16:
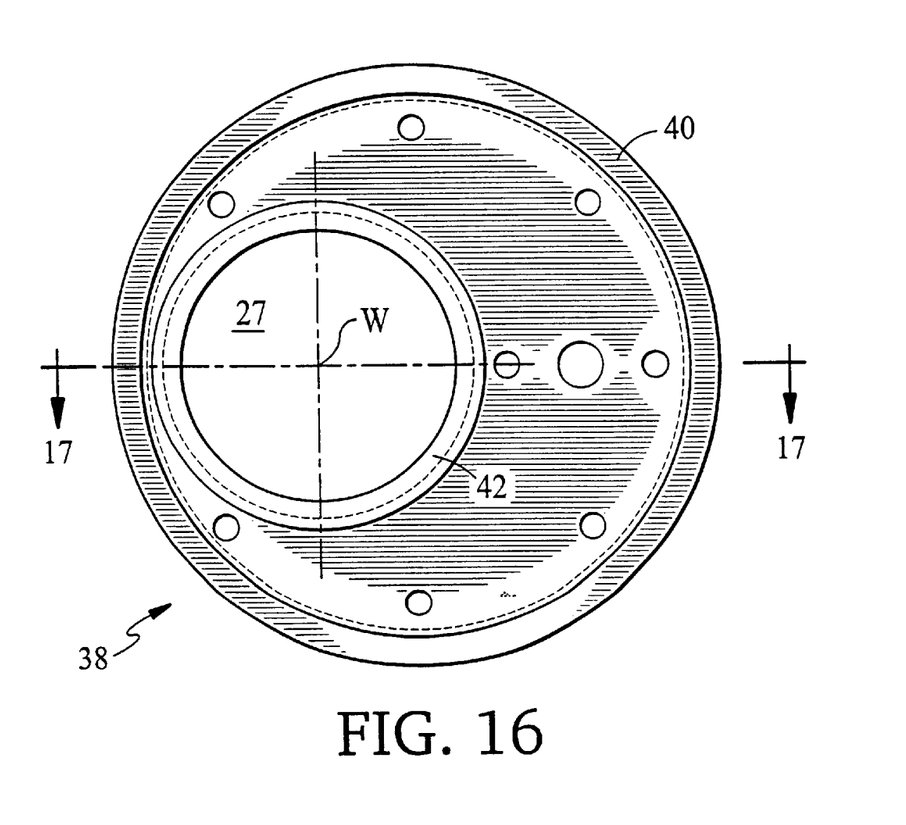
FIG. 16 is a bottom plan view of the clapper diaphragm of FIG. 15.
Figure 17:
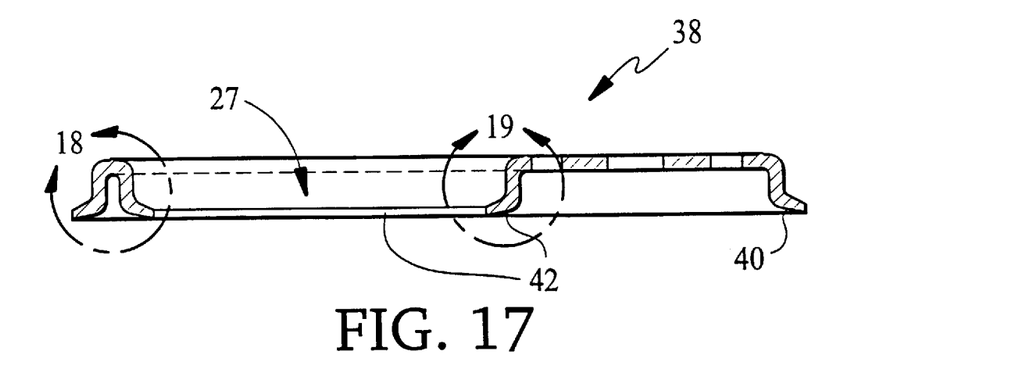
FIG. 17 is a side sectional view of the clapper diaphragm of FIG. 15, taken at the line 17—17 of FIG. 16.

Referring now in particular to FIGS. 7 and 16, in the differential-type dry pipe valve 10 of the invention, the axis, W, of the supply (water) pressure (i.e., the axis of the water valve seat 32 and water valve seal 42) is positioned relatively closer to the pivot axis, C, of the clapper, as compared to the center axis, A, of the system (air) pressure (i.e. the axis of the air valve seat 30 and air valve seal 32). The setback of the pivot, C, from the air valve seat 30 is also reduced. This arrangement provides a mechanical advantage to the system (air) pressure due to the non-concentric locations of the dry system seat 30 and the water supply seat 32, and the resulting force from the hinge connection of the seating body 28 and clapper assembly 56 helping to hold the clapper 34 and clapper diaphragm 38 in sealing engagement against the seats. As a result of this construction, with the water valve seat 32 off-center from the air valve seat 30, the differential of system water pressure to system air pressure at which the dry pipe valve 10 of the invention operates (i.e., opens) can be maintained within the industry standard of 5.5 (+/−0.3) with a dry pipe valve having a significantly smaller clapper and valve, as compared to prior art differential-type dry pipe valves of corresponding specification, e.g. weight reduction of up to 50% has been achieved in dry pipe valves 10 of the invention.

As seen in the following equations, for a 6-inch diameter valve, the diameter of the air valve seat 30 is reduced to 10.6 inches, as compared to 14 inches according to the prior art concentric seat designs:

$$DF=(AD/WD)^2 * L2/L1$$

$$AD=\sqrt{DF*WD^2*L2/L1}$$

$$WD=6; \; DF=5.5; \; L2=3; \; L1=AD/2$$

$$AD=\sqrt{DF*WD^2*3/(AD/2)}$$

$$AD=\sqrt[3]{5.5*6^2*6}$$

$$AD=10.6 \text{ inches}$$

The result is a differential-type dry pipe valve for a fire protection sprinkler system of advantageous construction in which the ratio of effective air sealing area to service water sealing area is smaller than the ratio of service water pressure to system air pressure at which the fire protection sprinkler system is actuated.

Figure 1:
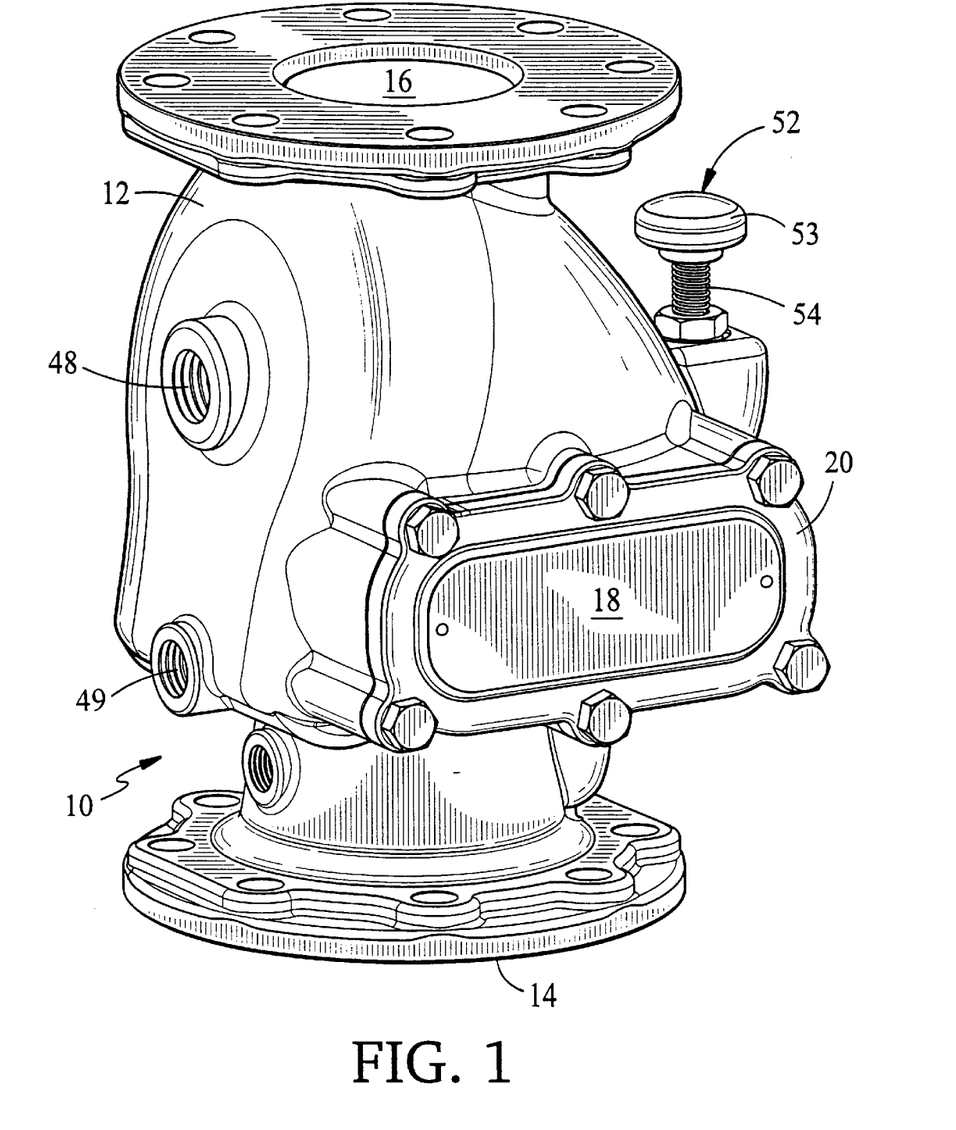
FIG. 1 is a perspective view of a dry pipe valve of the invention.
Figure 2:
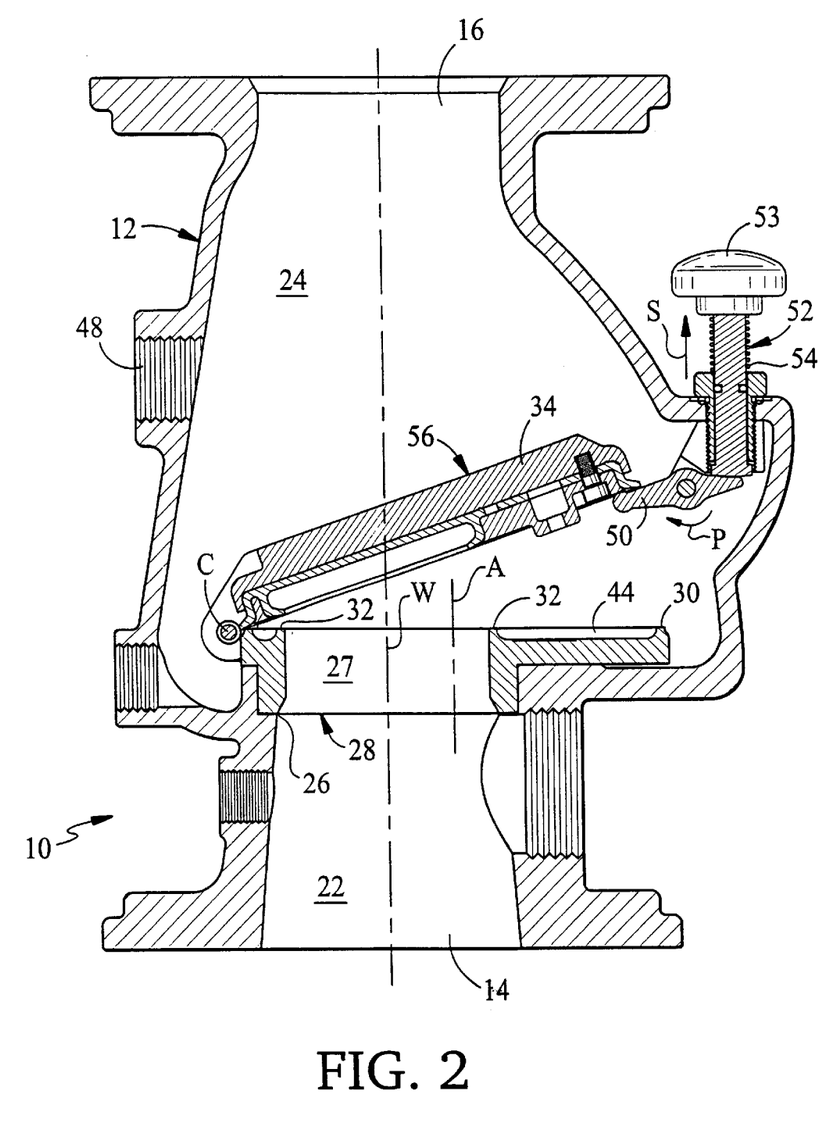
FIG. 2 is a first side sectional view of the dry pipe valve of FIG. 1, taken at the line 2—2 of FIG. 3.
Figure 3:
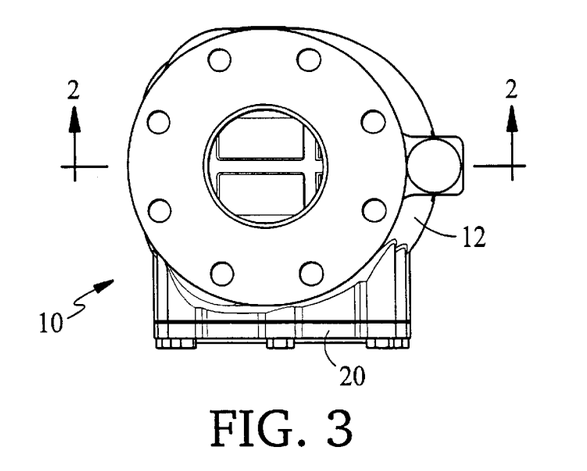
FIG. 3 is a top view of the dry pipe valve of FIG. 1.
Figure 4:
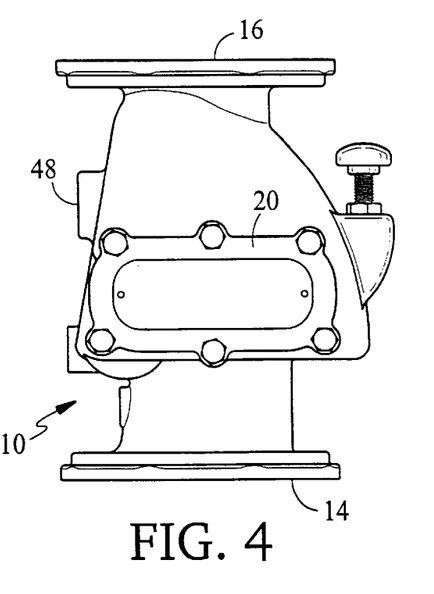
FIGS. 4 and 5 are opposite side sectional views of the dry pipe valve of FIG. 1.
Figure 5:
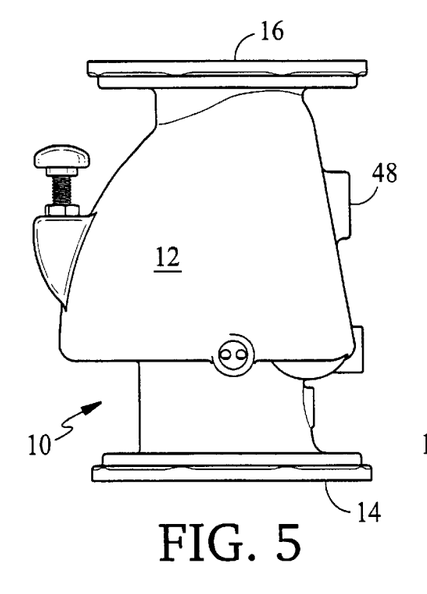
Figure 6:
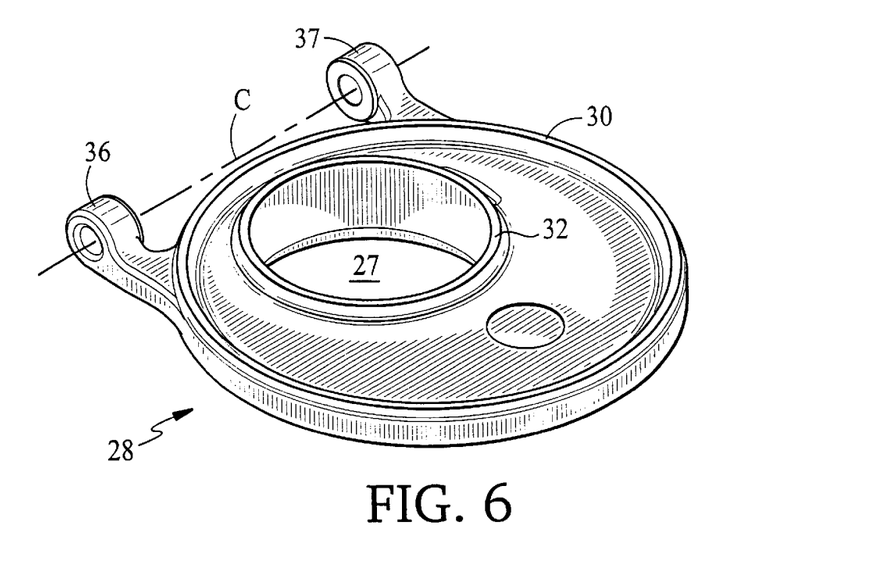
FIG. 6 is a perspective view of the seat body of the dry pipe valve of FIG. 1.

Referring again to FIG. 2, as the clapper 34 moves from its closed position towards its open position, e.g. upon reduction of air pressure in the air-side chamber 24 due to opening of one or more sprinkler heads in response to a fire condition, pivot arm 50 associated with latch assembly 52 is deflected upward by the clapper 34, allowing the clapper to pass. The pivot arm 50 then rotates back toward its initial position (e.g., under force of gravity) to engage with the underside of the clapper assembly 56 (i.e., clapper 34 and retaining plate 39, with diaphragm 38 secured therebetween) to hold the valve open for flow of water into the system of fire sprinkler piping, e.g. as shown in FIG. 2). When the fire situation is secured, water flow to the dry pipe valve 10 is discontinued. The clapper assembly 56, including the clapper 34, can then be allowed to return to its closed position, with the seals 40, 42 of the clapper diaphragm 38 disposed in sealing engagement with the seats 30, 32 of the seat casting 28, by applying downward pressure to the actuator 53 of clapper latch assembly 52 located outside the body 12, overcoming the force (arrow, S) of spring 54, to rotate the pivot arm 50 (arrow, P) to clear the outer end of the clapper assembly 56, allowing it to fall back toward the closed position. The spring 54 then returns the clapper latch assembly 52, and pivot arm 50 returns by gravity, to the respective standby positions.

Figure 18:
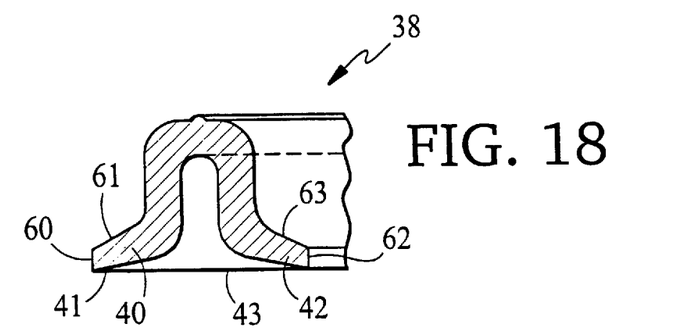
FIG. 18 is an enlarged side sectional view of the air valve seal and water valve seal of the clapper diaphragm of FIG. 15, taken at the line 18—18 of FIG. 17.
Figure 19:
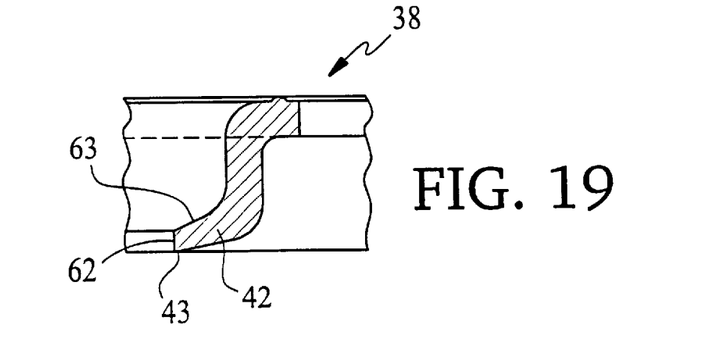
FIG. 19 is a similarly enlarged side sectional view of the water valve seal of the clapper diaphragm of FIG. 15, taken at the line 19—19 of FIG. 17.
Figure 20:
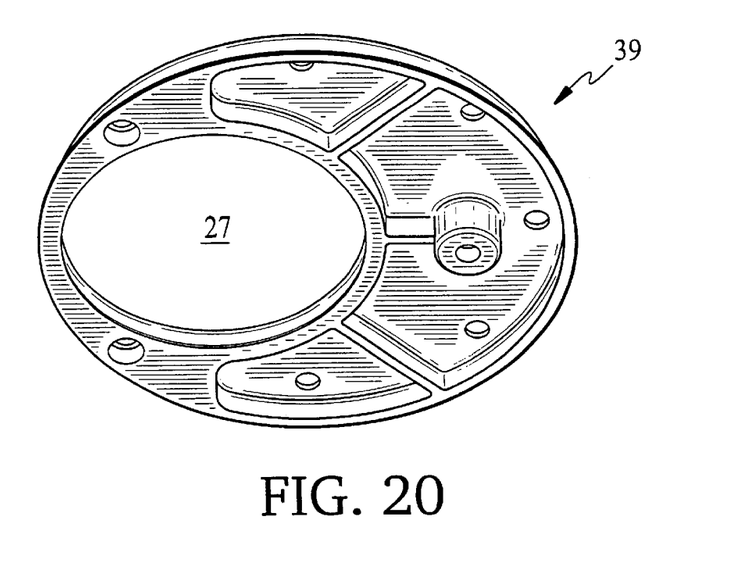
FIG. 20 is a perspective view of a clapper diaphragm retaining plate for the dry pipe valve of FIG. 1.
Figure 21:
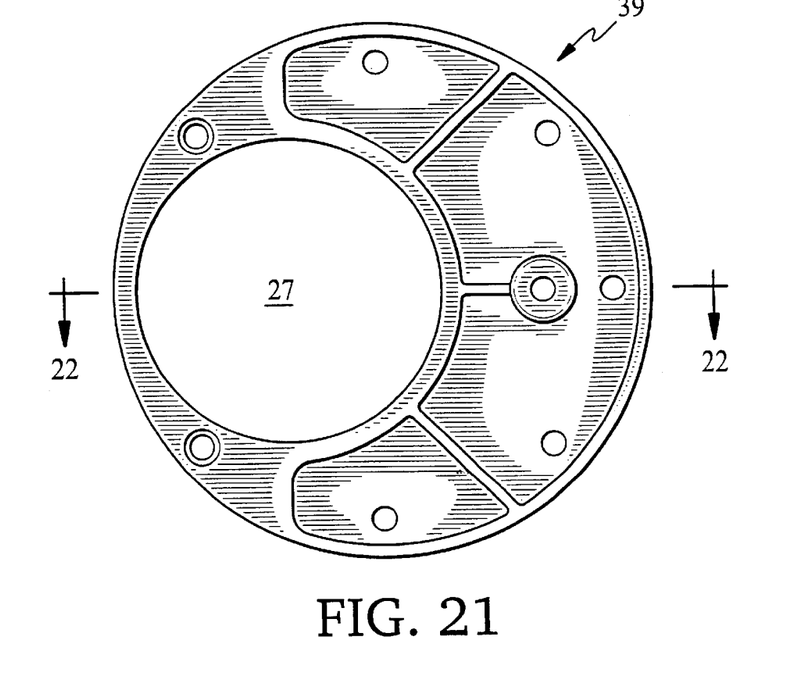
FIG. 21 is a bottom plan view of the clapper diaphragm retaining plate of FIG. 20.
Figure 22:
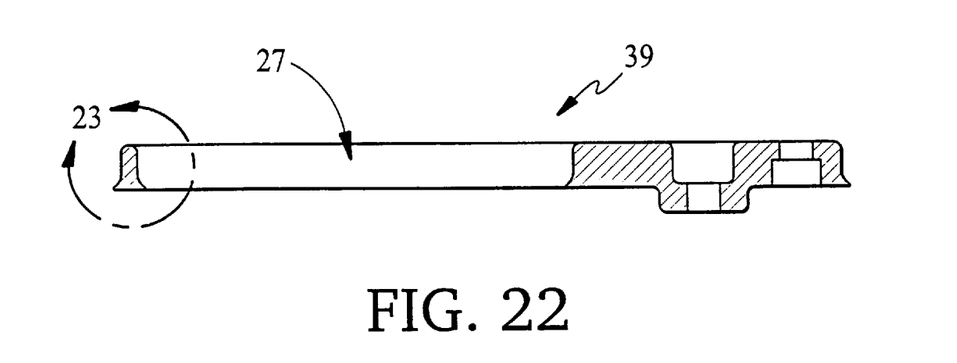
FIG. 22 is a side sectional view of the clapper diaphragm retaining plate of FIG. 20, taken at the line 22—22 of FIG. 21.
Figure 23:
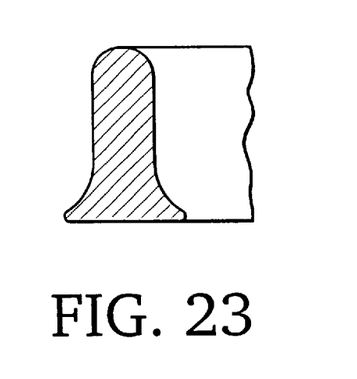
FIG. 23 is an enlarged side sectional view of the clapper diaphragm support rim of the clapper diaphragm retaining plate of FIG. 20, taken at the line 23—23 of FIG. 22.

Referring now in particular to FIGS. 18 and 19, the air valve seal 40 and the water valve seal 42 defined by the clapper diaphragm 38 are configured at rest with self-sealing, self-aligning, flexible cantilevered lips 60, 62, respectively. The seal lips have first surfaces 41, 43, respectively, deflected by engagement upon the corresponding seat 30, 32, and opposite, second surfaces 61, 63 exposed for application of seal-assisting pressure. In the case of the water valve seal 42, pressure is applied upon surface 63 by water in the water-side chamber 22, and in the case of the air seal 40, pressure is applied upon surface 61 by air or by water in the air-side chamber 24, to facilitate sealing. The clapper diaphragm 38 is typically formed of a soft rubber or polymeric material, e.g. EPDM, having a durometer of about 60 to 70. Where this relatively soft seal material is employed, the clapper 34 is typically provided with an outer lip surface 70 (FIG. 16) for supporting the air valve seal 40 against extrusion or leakage under pressure. The surface 70 may be smoothly curved or stepped, or where the clapper diaphragm is formed of a relatively harder material, it may be found unnecessary.

Figure 24:
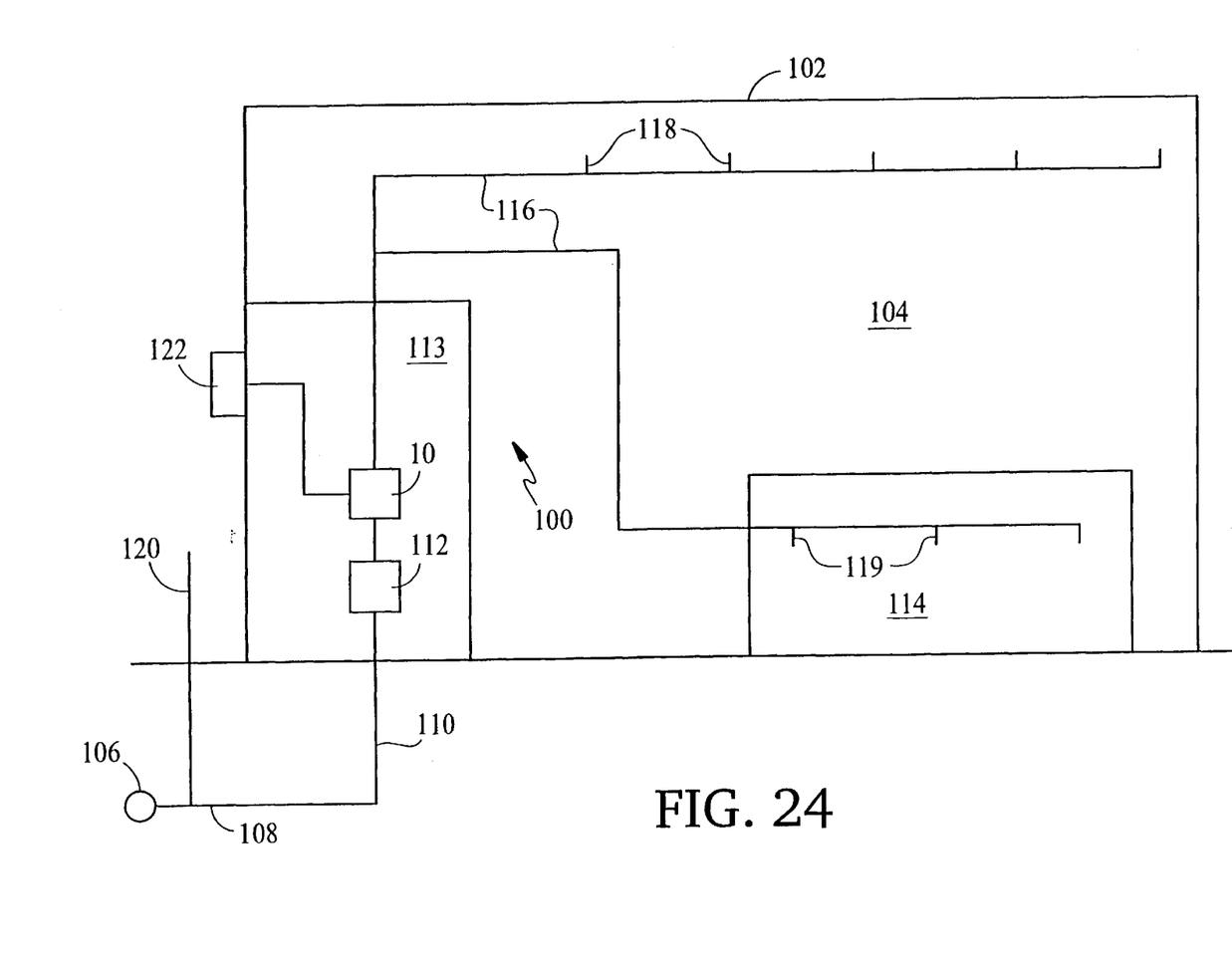
FIG. 24 is a somewhat diagrammatic view of an automatic fire protection sprinkler system equipped with a dry pipe valve of the invention.

Referring now to FIG. 24, a typical dry pipe fire protection sprinkler system 100 equipped with a differential-type dry pipe valve 10 of the invention will now be described. A dry pipe fire protection sprinkler system 100 is typically employed for protection of a warehouse or other structure 102 located in a geographical region subject to temperatures below freezing and having unheated areas 104 that must be protected against fire. The system 100 is connected to a reliable external source of water, e.g. a city main 106, through a fire main 108, riser 110, and check valve 112. The dry pipe valve 10 is preferably located within an enclosure 113 provided with heat, or in a heated office area 114, to protect against freezing. The dry pipe valve outlet 16 is connected to a system of piping 116, with spaced fire sprinkler heads 118, 119 extending throughout the structure 102.

To protect against freezing, the portions of the system of piping within at least the unheated portion of the structure are filled with air or other gas, e.g., nitrogen, under sufficient pressure to maintain the dry pipe valve 10 in closed position against the water supply pressure, as discussed above. In the presence of a fire condition, one or more of the sprinklers 118, 119 is caused to open automatically in response to local fire temperature. The resulting reduction of air pressure within the system of piping (and within the air-side chamber of the dry pipe valve) allows the dry pipe valve to open, permitting flow of water through the system of piping to the open sprinkler(s) 118, 119. A water motor gong 122 mounted to an outer wall of the structure provides an external notice of flow of water to the sprinklers.

Once the fire has been extinguished, water flow into the fire protection system 100 is discontinued, e.g. at post indicator valve 120. The clapper assembly 56 in dry pipe valve 10 is then allowed to return to its closed position by depressing actuator 53 of latch assembly 52 to rotate pivot arm 50 and release the clapper assembly. After any open sprinkler has been replaced, the system of piping 116 is recharged, and water flow to the inlet 14 of the dry pipe valve 10 is restored.

A number of embodiments of the invention have been described. Nevertheless, it will be understood that various modifications may be made without departing from the spirit and scope of the invention. For example, referring to FIGS. 1 and 2, the body 12 defines a water inlet port 48 that permits a predetermined volume of water to be delivered into the air-side chamber 24 to cover the clapper 34. This priming has, in the past, been found advantageous for facilitating sealing and lubrication of the air valve seal 40, but may not be necessary in all instances, e.g., due to improvements in formulation of sealing materials.

Accordingly, other embodiments are within the scope of the following claims.

What is claimed is:

1. A dry pipe valve comprising:
a body having a passage extending along a longitudinal axis between an inlet and an outlet, the body including an access port communicating with the passage, the access port being disposed generally on a plane parallel to the longitudinal axis, the access port having a length along the longitudinal axis less than a width generally orthogonal to the longitudinal axis;
a cover positioned over the access port;
a seat disposed in the passage;
a clapper disposed in the passage proximate the seat; and
an actuator supported by the body, the actuator having a knob exterior to the body and an end extending into the passage, the end interacting with the clapper to locate the clapper with respect to the seat to prevent fluid flow through the passage via movement of the knob along the longitudinal axis.

2. The dry pipe valve of claim 1, wherein the clapper comprises first and second sealing surfaces, the seat having a first seating surface circumscribing the longitudinal axis and a second seating surface cincturing the first seating surface to define a seat axis offset to the longitudinal axis, the clapper being contiguous to the seat in a first position to occlude fluid flow through the passage and being spaced from the seat in a second position to permit fluid flow through the passage.

3. The dry pipe valve of claim 2, wherein the clapper comprises a generally circular member defining a first effective area and a second effective area, the first effective area having a first diameter and the second effective area having a second diameter less than two times the first diameter, the first effective area communicating with the inlet and the second effective area communicating with the outlet.

4. The dry pipe valve of claim 3, wherein the clapper further comprises a unitary polymeric sealing member that forms the first and second sealing surfaces.

5. The dry pipe valve of claim 4, wherein the first effective area defines a first clapper axis and the second effective area defines a second clapper axis, the first clapper axis spaced at a first distance from the pivot axis, the second clapper axis spaced at a second distance from the pivot axis of less than about 1.8 times the first distance.

6. The dry pipe valve of claim 2, wherein the first seating surface comprises a generally circular seat surface defining a diameter of about 6 inches and the second seating surface comprises a generally circular seat surface defining a diameter of less than 14 inches.

7. The dry pipe valve of claim 6, wherein the end of the actuator engages a pivot arm pivotable about an axis orthogonal to the longitudinal axis to support the clapper in the position to permit fluid flow through the passage.

8. A differential dry pipe valve comprising:
a body defining a passage extending along a longitudinal axis between an inlet and an outlet;
a clapper pivotable about an axis orthogonal to the longitudinal axis, the clapper having first and second sealing surfaces that define first and second respective central axes, the clapper having a first operative position in the passage so that the first and second central axes are in a first location, and a second operative position in the passage so that both the first and second central axes are in a second location different from the first location; and
a seat coupled to the body, the seat having first and second seating surfaces disposed generally on the seat, the first seating surface disposed about the longitudinal axis, the second seating surface cincturing the first seating surface to define a seat axis offset to the longitudinal axis.

9. The dry pipe valve of claim 8, wherein the seat comprises a generally circular seat body having a diameter of less than 14 inches about the seat axis and one of the seating surfaces having a diameter of about 6 inches.

10. The dry pipe valve claim 9, wherein the clapper comprises a first surface area exposed to the inlet and a second surface area exposed to the outlet, the first surface area having a first center of pressure located at a first distance from the pivot axis, the second surface area having a second center of pressure located at a second distance greater than the first distance so that the clapper is maintained in a position with the seat to prevent flow when a ratio of pressure being applied to the second center of pressure relative to the first center of pressure is at least 5.5.

11. The dry pipe valve of claim 10, wherein the inlet comprises an inside diameter of about 6 inches and at least one of the sealing and seating surfaces having a diameter of less than 14 inches.

12. The dry pipe valve of claim 11, wherein at least one of the first and second sealing surface comprises cantilevered lips extending oblique to the longitudinal axis.

13. The dry pipe valve of claim 11, wherein the second distance is less than about 1.8 times the first distance.

14. The dry pipe valve of claim 10, wherein the clapper further comprises a retainer plate sandwiching a unitary sealing member between the clapper and the retainer plate, the unitary sealing member defining the first and second sealing surfaces.

15. A method of operating a dry pipe valve, the dry pipe valve having a body with a passage extending along a longitudinal axis between an inlet and an outlet, a member pivotable about an axis between a first position occluding a flow of fluid through the passage and a second position permitting the flow of fluid through the passage, the member having a first operative side and a second operative side, the method comprising:
applying a first fluid pressure to the first operative side having a first effective surface area concentric to the longitudinal axis and a second fluid pressure to the second operative side having a second effective surface area offset to the longitudinal axis and less than five times the first effective surface area to inhibit fluid flow through the passage; and
changing one of the first and second fluid pressures so that the member pivots from the first position toward the second position to permit fluid flow through the passage.

16. The method of claim 15, wherein the applying comprises supplying the first fluid pressure from a water supply and the second fluid pressure to a plurality of unactuated sprinklers.

17. The method of claim 16, wherein the applying comprises supplying pressurized fluid to the second effective area of approximately three times the first effective area.

18. The method of claim 17, wherein the changing comprises at least one of increasing the first pressure and decreasing the second pressure such that the ratio of the second pressure to the first pressure is less than approximately 5.5.

19. A differential dry pipe valve comprising:
a body defining a passage extending along a longitudinal axis between an inlet and an outlet, the inlet having an inside diameter of about 6 inches;

a clapper pivotable about an axis orthogonal to the longitudinal axis, the clapper having first and second sealing surfaces that define first and second respective axes, at least one of the first and second sealing surface including cantilevered lips extending oblique to the longitudinal axis, the clapper including a first surface area exposed to the inlet and a second surface area exposed to the outlet, the first surface area having a first center of pressure located at a first distance from the pivot axis, the second surface area having a second center of pressure located at a second distance greater than the first distance so that the clapper is maintained in a position with the seat to prevent flow when a ratio of pressure being applied to the second center of pressure relative to the first center of pressure is at least 5.5, the clapper including a retainer plate sandwiching a unitary sealing member between the clapper and the retainer plate, the unitary sealing member defining the first and second sealing surfaces; and a seat coupled to the body, the seat having first and second seating surfaces disposed generally on the seat, the first seating surface disposed about the longitudinal axis, the second seating surface cincturing the first seating surface to define a seat axis offset to the longitudinal axis, the seat having a generally circular seat body having a diameter of less than 14 inches about the seat axis and one of the seating surfaces having a diameter of about 6 inches, at least one of the sealing and seating surfaces having a diameter of less than 14 inches.

20. A method of operating a dry pipe valve, the dry pipe valve having a body with a passage extending along a longitudinal axis between an inlet and an outlet, a member pivotable about an axis between a first position occluding a flow of fluid through the passage and a second position permitting the flow of fluid through the passage, the member having a first operative side and a second operative side, the method comprising:

applying a first fluid pressure to the first operative side having a first effective surface area and a second fluid pressure to the second operative side having a second effective surface area less than five times the first effective surface area to inhibit fluid flow through the passage;

supplying the first fluid pressure from a water supply and the second fluid pressure to a plurality of unactuated sprinklers;

supplying pressurized fluid to the second effective area of approximately three times the first effective area;

locating the first effective surface area generally concentric to the longitudinal axis;

locating the second effective surface area offset with respect to the longitudinal axis; and changing one of the first and second fluid pressures so that the member pivots from the first position toward the second position to permit fluid flow through the passage, the changing including at least one of:
increasing the first pressure; and
decreasing the second pressure such that the ratio of the second pressure to the first pressure is less than approximately 5.5.

* * * * *